United States Patent
Knausz et al.

(10) Patent No.: US 9,865,189 B2
(45) Date of Patent: Jan. 9, 2018

(54) DISPLAY DEVICE HAVING POWER SAVING GLANCE MODE

(71) Applicant: SYNAPTICS INCORPORATED, San Jose, CA (US)

(72) Inventors: Imre Knausz, Fairport, NY (US); Jeffrey A. Small, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 89 days.

(21) Appl. No.: 14/871,371

(22) Filed: Sep. 30, 2015

(65) Prior Publication Data

US 2017/0092171 A1 Mar. 30, 2017

(51) Int. Cl.
*G09G 3/20* (2006.01)
*G06F 3/041* (2006.01)
*G09G 3/36* (2006.01)

(52) U.S. Cl.
CPC .............. *G09G 3/20* (2013.01); *G06F 3/041* (2013.01); *G09G 3/3648* (2013.01); *G09G 3/3688* (2013.01); *G09G 2300/08* (2013.01); *G09G 2310/0297* (2013.01); *G09G 2330/021* (2013.01); *G09G 2330/023* (2013.01); *G09G 2340/08* (2013.01)

(58) Field of Classification Search
CPC ......... G09G 3/3688; G09G 2310/0297; G09G 2310/08; G09G 2320/0233
See application file for complete search history.

(56) References Cited

U.S. PATENT DOCUMENTS

| | | |
|---|---|---|
| 6,414,665 B2 | 7/2002 | Libsch et al. |
| 8,154,495 B2 | 4/2012 | Hsu |
| 8,159,444 B2 | 4/2012 | Go |
| 8,228,276 B2 | 7/2012 | Lee et al. |
| 8,264,478 B2 | 9/2012 | Kim |
| 8,390,612 B2 | 3/2013 | Chen |
| 8,390,655 B2 | 3/2013 | Yoshiga |
| 8,471,875 B2 | 6/2013 | Chaji et al. |
| 2008/0303749 A1* | 12/2008 | Cassidy ............... G09G 3/3688 345/55 |
| 2009/0102777 A1 | 4/2009 | Izumikawa et al. |
| 2011/0175858 A1* | 7/2011 | Lee ....................... G09G 3/3688 345/204 |
| 2011/0234605 A1 | 9/2011 | Smith et al. |
| 2013/0241901 A1* | 9/2013 | Bae ....................... G09G 3/3614 345/204 |
| 2014/0098083 A1* | 4/2014 | Lee ....................... G09G 3/3291 345/213 |

FOREIGN PATENT DOCUMENTS

| | | |
|---|---|---|
| CN | 103150993 A | 6/2013 |
| WO | WO-2007069205 A2 | 6/2007 |

* cited by examiner

*Primary Examiner* — Shaheda Abdin

(74) *Attorney, Agent, or Firm* — Patterson + Sheridan, LLP

(57) ABSTRACT

An example processing system for a display device includes driver circuitry and a control circuit. The driver circuitry is coupled to a plurality of source line nodes in the display device, each source line node of the plurality of source line nodes coupled to a plurality of subpixel columns through a demultiplexer having a plurality of switches. The control circuit is coupled to each demultiplexer. The control circuit is configured to operate each demultiplexer in a first mode by successively activating the respective plurality of switches, and in a second mode by concurrently activating the respective plurality of switches.

14 Claims, 6 Drawing Sheets

DISPLAY DEVICE HAVING POWER SAVING GLANCE MODE

BACKGROUND

Field of the Disclosure

Embodiments of disclosure generally relate to display devices and, more particularly, to a display device having a power saving glance mode.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Display panels in input devices typically use source drivers to update the voltage across individual pixels. For example, each source driver may be coupled to multiple subpixel source lines through a demultiplexer. The demultiplexers are used to successively drive source lines of the different subpixels (e.g., red, green, and blue subpixels). However, this switching operation performed by the demultiplexers consumes a large amount of power. The power is spent by constantly charging and discharging parasitic capacitances associated with the demultiplexers.

SUMMARY

Techniques for providing a display device with a power saving glance mode are described. In an embodiment, a processing system for a display device includes driver circuitry and a control circuit. The driver circuitry is coupled to a plurality of source line nodes in the display device, each source line node of the plurality of source line nodes coupled to a plurality of subpixel columns through a demultiplexer having a plurality of switches. The control circuit is coupled to each demultiplexer. The control circuit is configured to operate each demultiplexer in a first mode by successively activating the respective plurality of switches, and in a second mode by concurrently activating the respective plurality of switches.

In another embodiment, a display device includes a plurality of pixel columns each having a plurality of subpixel columns. The display device further includes a plurality of source line nodes each coupled to the plurality of subpixel columns of a respective one of the pixel columns through a demultiplexer. The display device further includes a processing system, coupled to the plurality of source line nodes and each demultiplexer, the processing system configured to operate each demultiplexer in a first mode by successively activating the respective plurality of switches, and in a second mode by concurrently activating the respective plurality of switches.

A method of operating a display device having a plurality of pixel columns each having a plurality of sub-pixel columns includes driving a plurality of source line nodes each coupled to the plurality of subpixel columns of a respective one of the plurality of pixel columns through a demultiplexer. The method further includes operating each demultiplexer in a first mode by successively activating a plurality of switches of each demultiplexer. The method further includes operating each demultiplexer in a second mode by concurrently activating the plurality of switches of each demultiplexer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
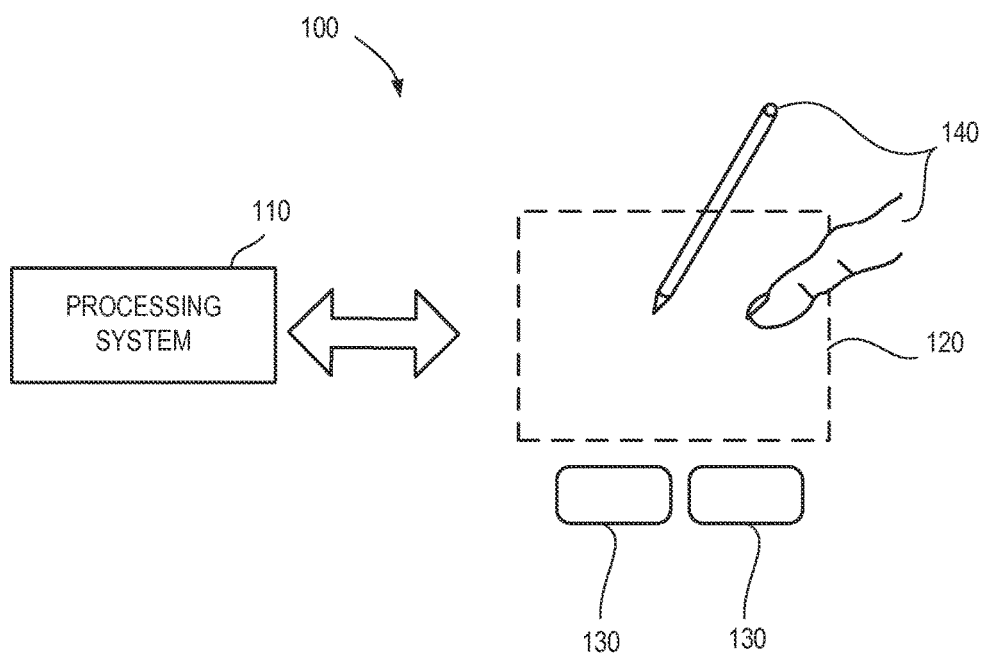
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element (s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
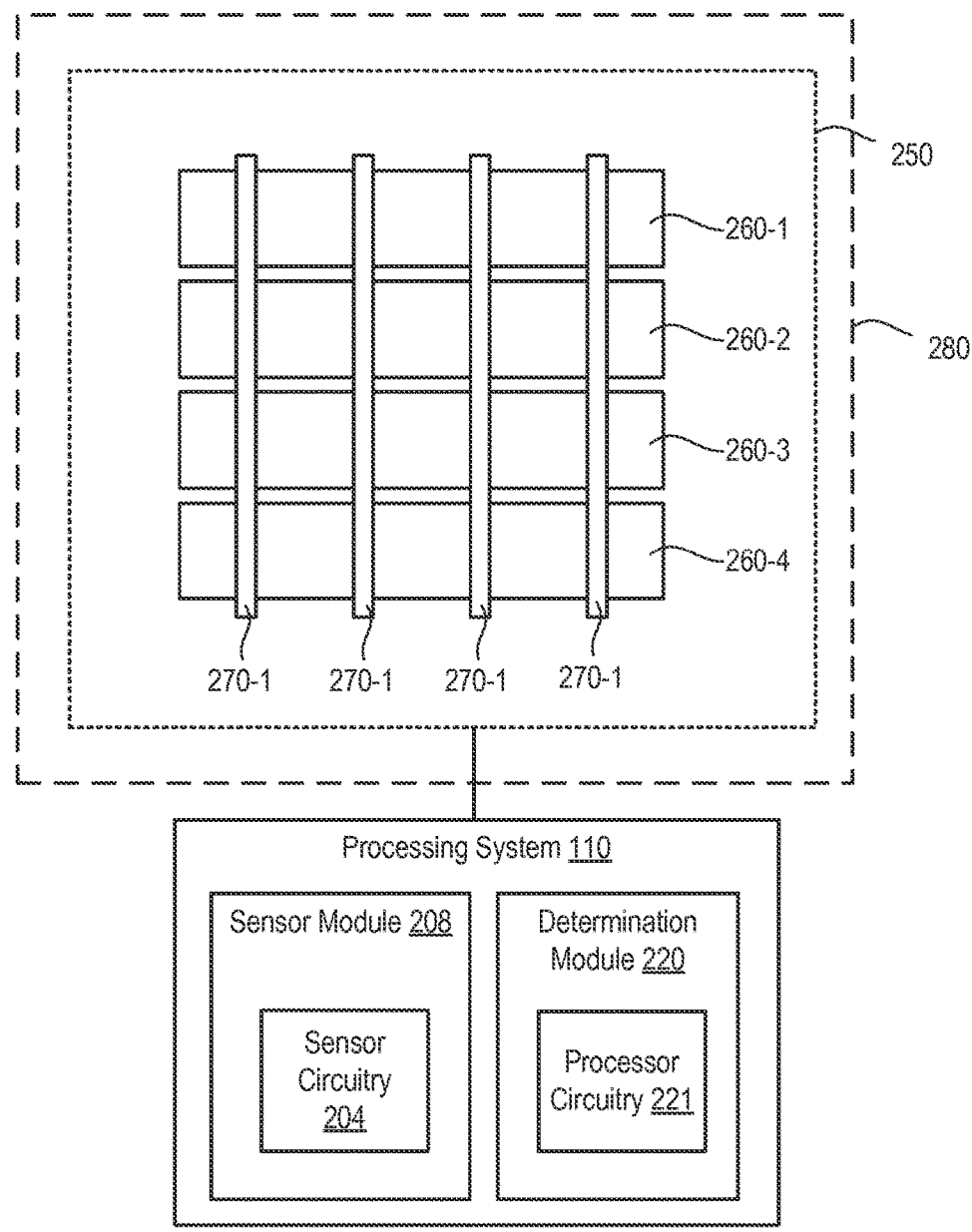
FIG. 2 illustrates a portion of an exemplary pattern of sensing elements according to some embodiments.

FIG. 2 illustrates a portion of an exemplary pattern of sensing elements according to some embodiments. For clarity of illustration and description, FIG. 2 shows the sensing elements in a pattern of simple rectangles and does not show various components, such as various interconnects between the sensing elements and the processing system 110. An electrode pattern 250 comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250 can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor module 208 operates the electrode pattern 250 to receive resulting signals from electrodes in the electrode pattern using a capacitive sensing signal having a sensing frequency. The resulting signals measure capacitive couplings (e.g., absolute capacitive couplings between sensor electrodes and an input object or transcapacitive couplings between sensor electrodes). The resulting signals indicate changes in capacitance as a result of input object(s). The sensor circuitry 204 can include various circuits and circuit elements, such as switches, amplifiers, mixers, filters, down-converters, demodulators, analog-to-digital converters, and the like to receive the resulting signals.

The processing system 110 can include a determination module 220 configured to receive resulting signals from the sensor module 208, process the resulting signals, and generate data from the resulting signals, such as determining capacitive sensing data (also referred to as capacitive measurements) from the resulting signals (e.g., a capacitive image or capacitive profile). The determination module 220 can track changes in capacitive sensing to detect input object(s) in the sensing region 120. The determination module 220 can include processor circuitry 221, such as a digital signal processor (DSP), microprocessor, microcontroller, or the like. The processor circuitry 221 can execute firmware and/or software to perform the various functions of the determination module 220 described herein.

The processing system 110 can include other modular configurations, and the functions performed by the sensor module 208 and the determination module 220 can, in general, be performed by one or more modules in the processing system 110. The processing system 110 can include other modules, and can perform other functions as described in some embodiments below.

The processing system 110 can operate in absolute capacitive sensing mode or transcapacitive sensing mode. In absolute capacitive sensing mode, the sensor module 208 provides resulting signals measuring absolute capacitive couplings between sensor electrodes and input object(s) (e.g., changes in absolute capacitance due to input object(s)). In transcapacitive sensing mode, the sensor module 208 provides resulting signals measuring transcapacitive couplings between sensor electrodes (e.g., changes in mutual capacitance between sensor electrodes due to input object(s)).

In some embodiments, the processing system 110 "scans" the electrode pattern 250 to determine capacitive couplings. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 3:
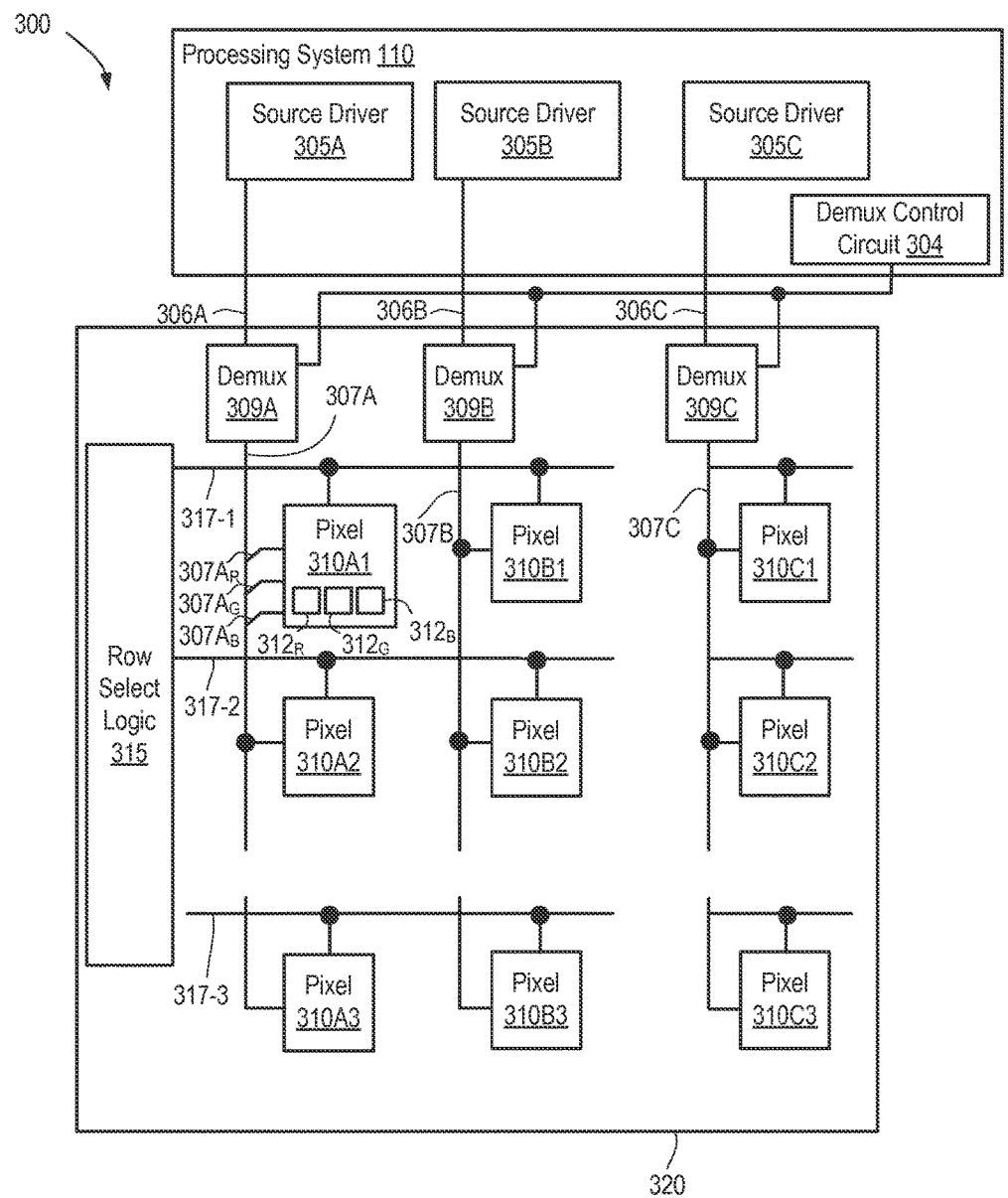
FIG. 3 is a schematic block diagram of a display device according to an embodiment.

FIG. 3 is a schematic block diagram of a display device 300 according to an embodiment. Specifically, the display device 300 of FIG. 3 may be integrated with an input device 100 and includes the processing system 110 and a display screen 320. The processing system 110 includes one or more source drivers 305 (e.g., source drivers 305A, 305B, and 305C) that are coupled to one or more source line nodes 306 (e.g., source line nodes 306A, 306B, and 306C, respectively). The source line nodes 306 are coupled to one or more demultiplexers 309 (e.g., demultiplexers 309A, 309B, and 309C) in the display screen 320. The demultiplexers 309 are coupled to one or more source line busses 307 (e.g., source line busses 307A, 307B, and 307C) in the display screen 320. The source line busses 307 are coupled to columns of pixels 310 in the display screen 320 ("pixel columns"). Each of the pixels 310 includes a plurality of subpixels 312. In the present example, each of the pixels 310 includes three subpixels $312_R$, $312_G$, and $312_B$ for red, green, and blue subpixels. Each of the source line busses 307 includes a source line for each subpixel. For example, source line bus 307A includes source lines $307A_R$, $307A_G$, and $307A_B$ for the red, green, and blue subpixels, respectively. For purposes of clarity by example, only the pixel 310A1 is shown in detail. The remaining pixels are configured similarly to the pixel 310A1. In the example, the pixels 310 include red, green, and blue subpixels and thus can also be referred to as "RGB pixels."

The display screen 320 includes row select logic 315 coupled to one or more gate lines 317 (e.g., gate lines 317-1, 317-2, and 317-3). The gate lines 317 are coupled to rows of the pixels 310 ("pixel rows"). The pixels 310 (in contrast to the capacitive pixels discussed above) may be used to display an image on the display screen 320. The pixels 310 may be used in a light emitting diode (LED), organic LED (OLED), cathode ray tube (CRT), liquid crystal display (LCD), plasma, electroluminescence (EL), or other display technology to display the image.

In the example of FIG. 3, the demultiplexers 309A, 309B, and 309C drive pixel columns A, B, and C, respectively, and the display screen 320 includes three pixel rows designated 1, 2, and 3. RGB Pixel column A includes pixels 310A1, 310A2, and 310A3; RGB pixel column B includes RGB pixels 310B1, 310B2, and 310B3; and RGB pixel column C includes RGB pixels 310C1, 310C2, and 310C3. As described herein, each RGB pixel column can be divided into columns of red, green and blue subpixels ("subpixel columns"). As such, each of source line busses 307A, 307B, and 307C comprises a set of source lines for the subpixel columns. For purposes of clarity by example, the display screen 320 includes three pixel columns and three rows. In general, the display screen 320 can include any number of pixel columns and pixel rows. That is, there can be zero or more pixel columns between pixel column B and C, and/or zero or more pixel rows between pixel rows 2 and 3.

In one embodiment, processing system 110 and display screen 320 are separate components. For example, the processing system 110 may be an ASIC that is communicatively coupled to the display screen 320 via one or more transmission lines. However, in one embodiment, processing system 110 may be integrated into display screen 320 (e.g., mounted on a common substrate) to form a single component.

The source drivers 305 may provide voltage signals ("source voltages"), which are coupled to the source line nodes 306. The demultiplexers 309 couple these source voltages to the source line busses 307. In particular, each demultiplexer 309 couples a given source voltage to one or more particular source lines of the subpixel columns. The processing system 110 can include a demultiplexer control circuit 304 coupled to the demultiplexers 309 for controlling subpixel column selection. The row select logic 315 supplies gate voltages to the row lines 317. By coordinating the gate voltages provided by the row select logic 315, the source voltage provided by the source drivers 305, and subpixel column control provided by the demultiplexer control circuit 304, the processing system 110 can set the pixels 310 and display an image on display screen 320.

In one embodiment, as discussed above, processing system 110 and display screen 320 may include touch-sensing circuitry and logic for supporting user input. For the sake of clarity, the embodiments provided below do not discuss touch sensing functions. However, these functions are explicitly contemplated. That is, the display circuitry and functions discussed herein may be combined with additional circuitry for enabling user input via touch-sensing.

Figure 4:
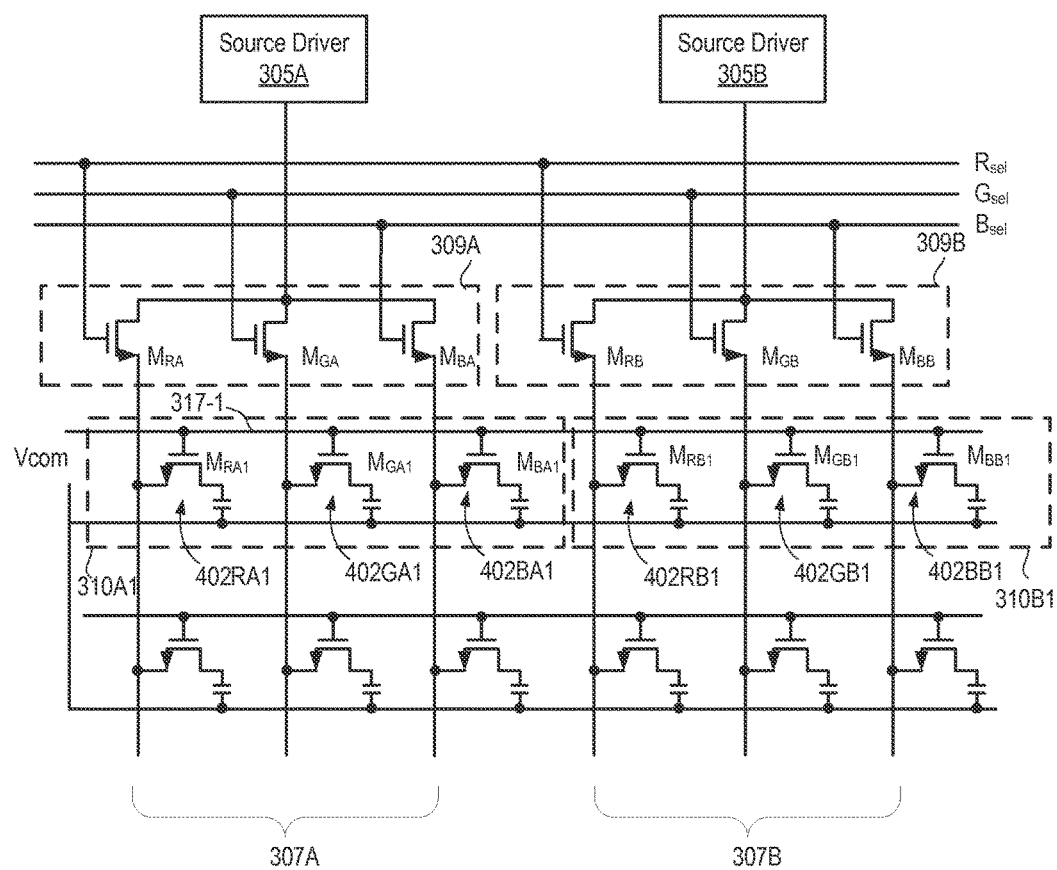
FIG. 4 is a block diagram showing more detail of the display device of FIG. 3 according to an embodiment.

FIG. 4 is a block diagram showing more detail of the display device 300 according to an embodiment. FIG. 4 shows in detail one pixel row (pixel row 1) and two pixel columns (pixel columns A and B). It is to be understood that other pixel rows and pixel columns can be configured similarly. In the example, each pixel comprises three subpixels associated with red, green, and blue colors, respectively. For example, the pixel 310A1 comprises subpixels 402RA1, 402GA1, and 402BA1 and the pixel 310B1 comprises subpixels 402RB1, 402GB1, and 402BB1. Each subpixel (generally referred to as "subpixel 402") includes a transistor (generally designed M). In the nomenclature of FIG. 4, the subscript of the subpixel transistor designates the color, column, and row in that order. Thus, the transistor $M_{RA1}$ is part of the red subpixel in pixel column A and pixel row 1 (i.e., subpixel 402RA1). As such, the pixel 310A1 includes transistors $M_{RA1}$, $M_{GA1}$, and $M_{BA1}$. The pixel 310B1 includes the transistors $M_{RB1}$, $M_{GB1}$, and $M_{BB1}$. For purposes of clarity by example, each pixel 310 is described has having three subpixels for red, green, and blue colors. In general, each pixel 310 can having a plurality of subpixels, and each subpixel can be associated with a particular color (not necessarily red, green, and blue).

Each demultiplexer 309 includes a transistor coupled between the source driver and the subpixel columns. In an embodiment, the transistors in the demultiplexers 309 comprise TFTs. In the example, the demultiplexer 309A includes transistors $M_{RA}$, $M_{GA}$, and $M_{BA}$ coupled between the source driver 305A and the source lines for the R, G, and B subpixel columns of the pixel column A. The demultiplexer 309B includes transistors $M_{RB}$, $M_{GB}$, and $M_{BB}$ coupled between the source driver 305B and the source lines for the R, G, and B subpixel columns of the pixel column B. The processing system 110 couples control voltages to the gates of the transistors in the demultiplexers 309 (e.g., using the demultiplexer control circuit 304). The transistors $M_{RA}$, $M_{GA}$, and $M_{BA}$ receive control voltages $R_{sel}$, $G_{sel}$, and $B_{sel}$, respectively. Likewise, the transistors $M_{RB}$, $M_{GB}$, and $M_{BB}$ receive control voltages $R_{sel}$, $G_{sel}$, and $B_{sel}$, respectively. The control voltages $R_{sel}$, $G_{sel}$, and $B_{sel}$ can be provided by the demultiplexer control circuit 304 (shown in FIG. 3).

The gate of each transistor M is coupled to a respective gate line. The drain of each transistor M is coupled to a pixel electrode, which has a capacitance to the common node "Vcom". The source of each transistor M is coupled to a respective source line. Further, each subpixel includes a parasitic capacitance between the source of its transistor M and Vcom, which represents the parasitic capacitance between the source line and Vcom, on a per-subpixel basis (not explicitly shown). Further, each subpixel includes a parasitic capacitance between the source of its transistor M and a row line, which represents the parasitic capacitance between the source line and the row line (not explicitly shown). Because the source line voltages are changing, power is consumed charging and discharging these parasitic capacitances. However, in column inversion mode, these voltages typically do not change significantly from line to line. For example, the voltage swing is typically less than five volts. Thus, the power dissipated due to these capacitances is relatively small.

In this embodiment, the pixels 310 are divided into three sub-pixels 402 that are combined to provide the color associated with the pixel 310—e.g., red, green, and blue subpixels. Accordingly, when setting the voltage, and thus, the color of a pixel 310, a source driver 305 may use three separate drive phases, one for each sub-pixel 402. When displaying a color image, the demultiplexers 309 permit the source voltage transmitted by the source drivers 305 to reach only one of the three subpixel source lines at any given time. Thus, each source driver 305 may use only one source line node to transmit unique source voltages to each of three subpixel source lines. The processing system 110 clocks each transistor in the demultiplexers 309 in succession for each display line to display a color image.

The transistors of the demultiplexers 309 are continually being switched on and off. As such, the parasitic capacitances associated with such transistors (not explicitly shown in FIG. 4) are continually being charged and discharged as a color image is being displayed. A significant percentage of the power consumed by the display can be attributed to the charging and discharging of the parasitic capacitances associated with the demultiplexer transistors.

In some embodiments, the processing system 110 can support a "glance mode" for the display screen 320. In the glance mode, the display screen 320 consumes less power than in the normal mode described above for displaying color images. In an embodiment, the processing system 110 drives the display screen 320 to display a monochromatic image in the glance mode. Since a monochromatic image is displayed in the glance mode, to consume less power, the processing system 110 controls each multiplexer 309 such that each transistor therein is switched on at the same time. As such, the same source voltage is applied to each subpixel of a given pixel in a given pixel row. In the glance mode, the demultiplexer transistors are not continually switched on and off, which avoids the charge/discharge cycle of the parasitic capacitances and conserves power. While techniques for reducing power consumption are described with respect to a glance mode, it is to be understood that such techniques can be used when displaying a monochromatic image in any mode.

For example, assume the row select logic 315 selects that gate line 317-1 as shown in FIGS. 3-4. In normal mode, to display a color image, the source drivers 305A and 305B output a source voltage for each of the red, green, and blue subpixels in succession. For example, the processing system 110 can operate in the normal mode by successively toggling gate voltage of each TFT in each demultiplexer 309. In a first cycle, for the red subpixels, the source driver 305A turns on the transistor $M_{RA}$ in the demultiplexer 309A, while the transistors $M_{GA}$ and $M_{BA}$ remain off. Likewise, the source driver 305B turns on the transistor $M_{RB}$ in the demultiplexer 309B, while the transistors $M_{GB}$ and $M_{BB}$ remain off. In a second cycle, for the green subpixels, the source driver 305A turns off the transistor $M_{RA}$ and turns on the transistor $M_{GA}$, while the transistor $M_{BA}$ remains off. Likewise, the source driver 305B turns off the transistor $M_{RB}$ and turns on the transistor $M_{GB}$, while the transistor $M_{BB}$ remains off. In a third cycle, for the blue cycle, the source driver 305A turns off the transistor $M_{GA}$ and turns on the transistor $M_{BA}$, while the transistor $M_{RA}$ remains off. Likewise, the source driver 305B turns off the transistor $M_{GB}$ and turns on the transistor $M_{BB}$, while the transistor $M_{RB}$ remains off. The processing system 110 repeats these three cycles for each pixel column and for each pixel row to display the color image.

In the glance mode, to display a monochromatic image, the source drivers 305A and 305B each output one source voltage for each of the red, green, and blue subpixels. For example, the processing system 110 can operate in the glance mode by holding substantially constant the gate voltage of each TFT in each demultiplexer. For the pixel column A, the processing system 110 concurrently turns on each transistor $M_{RA}$, $M_{GA}$, and $M_{BA}$. For pixel column B, the processing system 110 concurrently turns on each transistor $M_{RB}$, $M_{GB}$, and $M_{BB}$. Thus, a single source voltage supplied by the source driver 305A is coupled to each subpixel in the pixel column A. A single source voltage supplied by the source driver 305B is coupled to each subpixel in the pixel column B. The processing system 110 controls other pixel columns in similar fashion.

The techniques described above for reducing the power consumption of the demultiplexers 309 in a glance mode is applicable to various display panel drive modes, such as a frame inversion mode, a dot inversion mode, a line inversion mode, or a pixel column inversion mode, or a subpixel column inversion mode. In the various inversion modes, the average DC voltage on each subpixel is zero in order to prevent unwanted electrolytic deterioration of the subpixels (e.g., image sticking). In frame inversion mode, each pixel in the display screen is driven by a source voltage of one polarity for a first frame and the opposite polarity for a next frame. In a dot inversion mode, pixel polarities alternate within a frame according to a checkerboard pattern. In a line inversion mode, pixel polarities are the same in all even lines and opposite for all odd lines. In a column inversion mode, pixel polarities are the same in even columns and the opposite in odd columns. For column inversion, the columns can be either pixel columns (pixel column inversion) or subpixel columns (subpixel column inversion). In an embodiment, the processing system 110 can drive the display screen 320 according to any mode, such as any of the modes described above, when in the normal mode (e.g., displaying a color image). When in the glance mode (e.g., displaying a monochromatic image), the processing system 110 can drive the display screen 320 according the pixel column inversion mode. In some embodiments, while the processing system 110 implements the pixel column inversion mode for the glance mode, the processing system 110 implements a different mode (e.g., dot inversion) for the normal mode (e.g., display of a color image).

Figure 5:
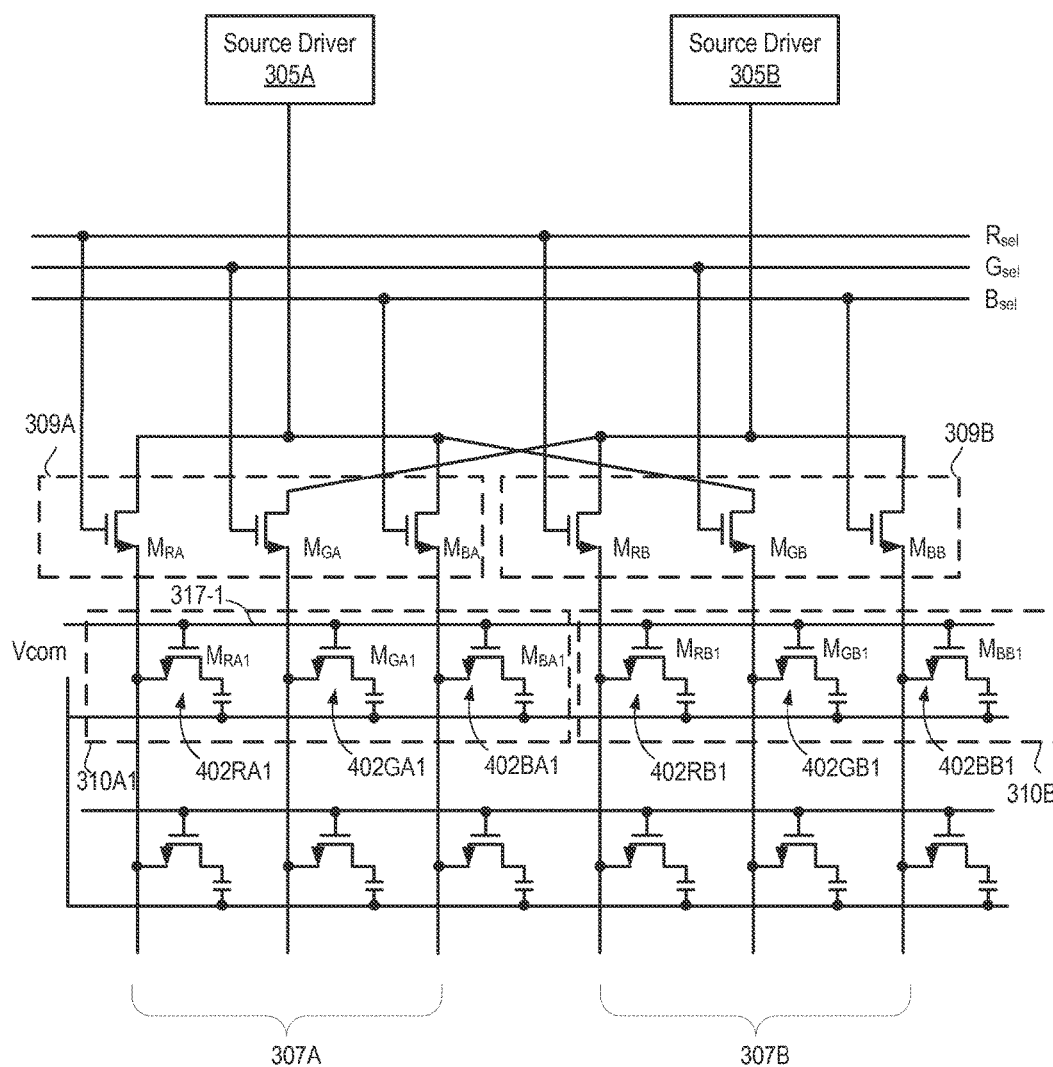
FIG. 5 is a block diagram showing more detail of the display device of FIG. 3 according to another embodiment.

FIG. 5 is a block diagram showing more detail of the display device 300 according to another embodiment. The display panel 320 in FIG. 5 is similar to that shown in FIG. 4, but is configured to swap the green subpixels between adjacent pixel columns (referred to as "green swap"). In the example, the source driver 305A is configured to drive the red and blue subpixels in the pixel column A, and the green subpixel in the pixel column B. The source driver 305B is configured to drive the red and blue subpixels in the pixel column B, and the green subpixel in the pixel column A. This pattern continues across the various pixel columns of the display panel 320. In general, for each source line node 306, the respective plurality of subpixel columns includes at least one subpixel column associated with one pixel column of the display device and at least one subpixel column associated with an adjacent pixel column of the display device.

The techniques described above for reducing the power consumption of the demultiplexers 309 in a glance mode is applicable to any of these subpixel swap patterns (e.g., green swap). In an embodiment, for each adjacent pair of pixel columns having swapped subpixel columns, the processing system 110 provides the same source voltage (e.g., the same luminance data). For example, the source driver 305A can provide the same source voltage as the source driver 305B. In such a configuration, all of the transistors in the demultiplexers 309A and 309B can be turned on concurrently, which as described above reduces power consumption. In such an embodiment, the horizontal resolution of the displayed monochromatic image would be half of that as for the display panel without swapped subpixel columns. This is because for a green-swap panel, the two green subpixels of each pair of pixels are swapped in position, which requires each pair of adjacent pixels to be driven identically.

Figure 6:
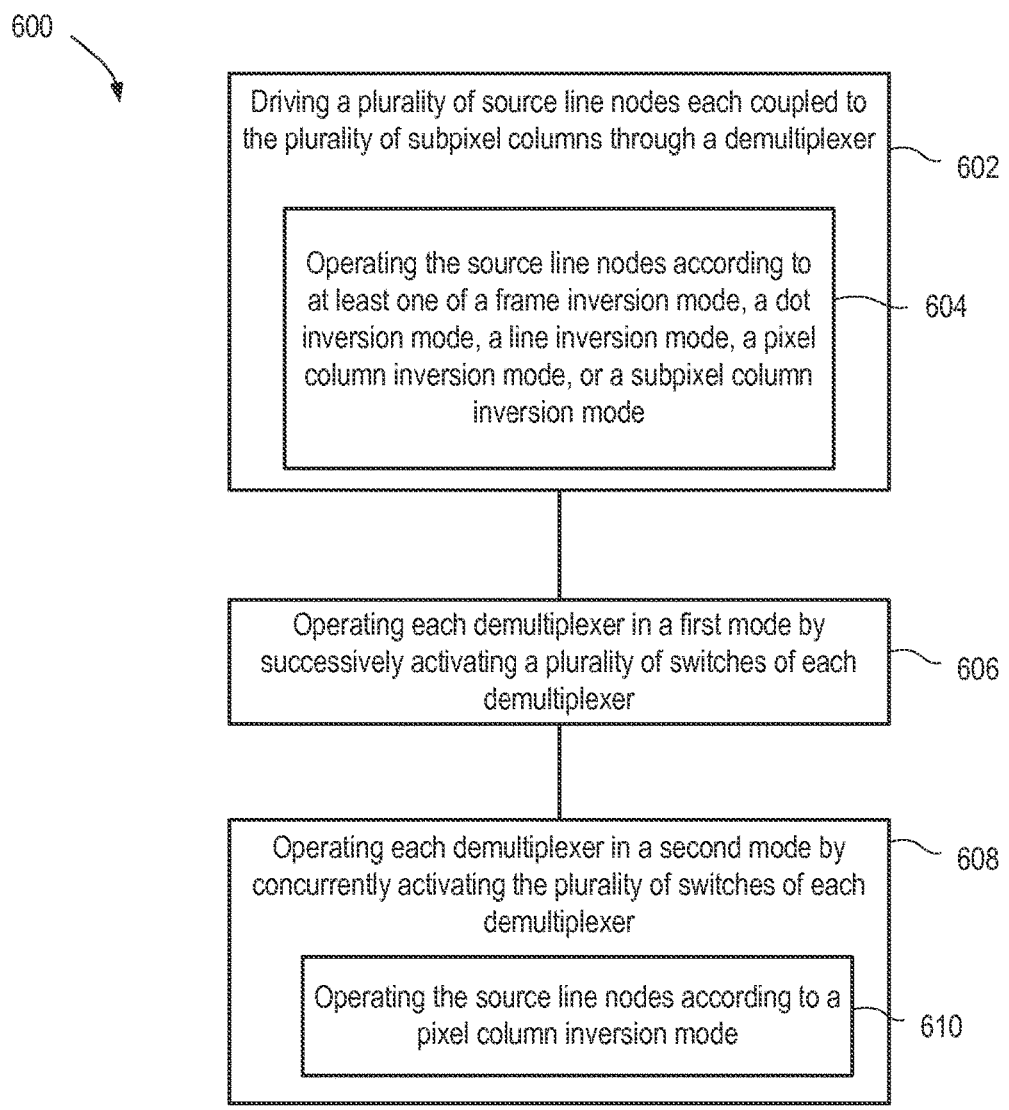
FIG. 6 is a flow diagram depicting a method of operating a display device having a plurality of pixel columns each having a plurality of sub-pixel columns according to an embodiment.

FIG. 6 is a flow diagram depicting a method 600 of operating a display device having a plurality of pixel columns each having a plurality of sub-pixel columns according to an embodiment. The method 600 can be performed by the processing system 110 described above. The method 600 begins at step 602, where the processing system 110 drives a plurality of source line nodes 306 each coupled to the plurality of subpixel columns through a demultiplexer 309. In an embodiment, at step 604, the processing system 110 operates the source line nodes 306 according to at least one of a frame inversion mode, a dot inversion mode, a line inversion mode, a pixel column inversion mode, or a subpixel column inversion mode.

At step 606, the processing system 110 operates each demultiplexer 309 in a first mode (e.g., normal mode for color image display) by successively activating a plurality of switches of each demultiplexer 309. At step 608, the processing system 110 operates each demultiplexer 309 in a second mode (e.g., glance mode for monochromatic image display) by concurrently activating the plurality of switches of each demultiplexer 309. In an embodiment, at step 610, the processing system 110 operates the source line nodes according to a pixel column inversion mode when in the second mode (e.g., glance mode).

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for a display device, comprising:
   driver circuitry coupled to a plurality of source line nodes in the display device, each source line node of the plurality of source line nodes coupled to a plurality of subpixel columns through a respective one of a plurality of switches of a demultiplexer, wherein each of the plurality of switches in each demultiplexer comprises a thin-film transistor (TFT); and
   a control circuit coupled to each demultiplexer, the control circuit configured to operate each demultiplexer in a first mode by successively toggling gate voltage of each TFT in each demultiplexer to successively activate the respective plurality of switches, and in a second mode by holding substantially constant the gate voltage of each TFT in each demultiplexer to concurrently activate the respective plurality of switches.

2. The processing system of claim 1, wherein the driver circuitry is configured to operate the plurality of source line nodes according to at least one of a frame inversion mode, a dot inversion mode, a line inversion mode, a pixel column inversion mode, or a subpixel column inversion mode.

3. The processing system of claim 2, wherein, when the control circuit operates in the second mode, the driver circuitry is configured to operate in the pixel column inversion mode.

4. The processing system of claim 3, wherein, when the control circuit operates in the first mode, the driver circuitry is configured to operate in a mode other than the pixel column inversion mode.

5. The processing system of claim 2, wherein, for each source line node of the plurality of source line nodes, the respective plurality of subpixel columns includes at least one subpixel column associated with one pixel column of the display device and at least one subpixel column associated with an adjacent pixel column of the display device.

6. A display device, comprising:
   a plurality of pixel columns each having a plurality of subpixel columns;
   a plurality of source line nodes each coupled to the plurality of subpixel columns of a respective one of the pixel columns through a respective one of a plurality of switches of a demultiplexer, wherein each of the plurality of switches in each demultiplexer comprises a thin-film transistor (TFT); and
   a processing system, coupled to the plurality of source line nodes and each demultiplexer, the processing system configured to operate each demultiplexer in a first mode by successively toggling gate voltage of each TFT in each demultiplexer to successively activate the respective plurality of switches, and in a second mode by holding substantially constant the gate voltage of each TFT in each demultiplexer to concurrently activate the respective plurality of switches.

7. The display device of claim 6, wherein the processing system is configured to operate the plurality of source line nodes according to at least one of a frame inversion mode, a dot inversion mode, a line inversion mode, a pixel column inversion mode, or a subpixel column inversion mode.

8. The display device of claim 7, wherein, the processing system operates the plurality of source line nodes in the pixel column inversion mode while operating each demultiplexer in the second mode.

9. The display device of claim 8, wherein the processing system operates the plurality of source line nodes in a mode other than the pixel column inversion mode while operating each demultiplexer in the first mode.

10. The display device of claim 7, wherein, for each source line node of the plurality of source line nodes, the respective plurality of subpixel columns includes at least one subpixel column associated with one of the plurality of pixel columns and at least one subpixel column associated with an adjacent one of the plurality of pixel columns.

11. A method of operating a display device having a plurality of pixel columns each having a plurality of subpixel columns, the method comprising:
    driving a plurality of source line nodes each coupled to the plurality of subpixel columns of a respective one of the plurality of pixel columns through a respective one of a plurality of switches of a demultiplexer, wherein each of the plurality of switches in each demultiplexer comprises a thin-film transistor (TFT);
    operating each demultiplexer in a first mode by successively toggling gate voltage of each TFT in each demultiplexer to successively activate a plurality of switches of each demultiplexer; and
    operating each demultiplexer in a second mode by holding substantially constant the gate voltage of each TFT in each demultiplexer to concurrently activate the plurality of switches of each demultiplexer.

12. The method of claim 11, the step of driving comprises operating the plurality of source line nodes according to at least one of a frame inversion mode, a dot inversion mode, a line inversion mode, a pixel column inversion mode, or a subpixel column inversion mode.

13. The method of claim 12, wherein, during the step of operating each demultiplexer in the second mode, the plurality of source line nodes are operated in the pixel column inversion mode.

14. The method of claim 13, wherein, during the step of operating each demultiplexer in the first mode, the plurality of source line nodes are operated in a mode other than the pixel column inversion mode.

* * * * *